(12) United States Patent
Greve

(10) Patent No.: US 10,407,245 B2
(45) Date of Patent: Sep. 10, 2019

(54) CONTINUOUS PRODUCT-PROCESSING APPARATUS AND METHOD FOR CLEANING WITH PRODUCT REPOSITIONING

(71) Applicant: Laitram, L.L.C., Harahan, LA (US)

(72) Inventor: Christopher G. Greve, Covington, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 15/815,287

(22) Filed: Nov. 16, 2017

(65) Prior Publication Data

US 2019/0144210 A1 May 16, 2019

(51) Int. Cl.
 *B65G 23/06* (2006.01)
 *B65G 45/14* (2006.01)
 (Continued)

(52) U.S. Cl.
 CPC ............... *B65G 23/06* (2013.01); *A21B 1/08* (2013.01); *A21B 1/48* (2013.01); *B65G 15/60* (2013.01);
 (Continued)

(58) Field of Classification Search
 CPC ........ B65G 23/06; B65G 23/10; B65G 23/12; B65G 23/36; B65G 23/44; B65G 45/14;
 (Continued)

(56) References Cited

U.S. PATENT DOCUMENTS 1,148,005 A 7/1915 Bogdanffy
3,583,555 A 6/1971 Karsnak et al.
(Continued)

FOREIGN PATENT DOCUMENTS

| CN | 204643189 U | 9/2015 |
|---|---|---|
| JP | 57065168 A | 4/1982 |
| KR | 10-1267599 B1 | 5/2013 |

OTHER PUBLICATIONS

Laitram Machinery, Inc., "Model FC Cooker" brochure, copyright 2007, Laitram Machinery, Inc.
(Continued)

*Primary Examiner* — Gene O Crawford
*Assistant Examiner* — Keith R Campbell
(74) *Attorney, Agent, or Firm* — James T. Cronvich

(57) ABSTRACT

A continuous product-processing apparatus having a conveyor capable of repositioning product and cleaning itself of debris and a method for its operation. The apparatus includes a conveyor that transports products atop a conveyor belt along a carryway to a processing chamber. Upper and lower diverting rollers guide the belt along an S-shaped product-repositioning path segment of the carryway. The diverting rollers are rotated at a speed normally greater than the speed of the conveyor belt to cause the belt to slip on the roller's periphery, which effects a scraping action against the conveying side of the belt to dislodge debris from the belt and the rollers. One-way ratcheting drives or belt restricters positioned on the product-positioning path segment to limit belt excursion are used to prevent the belt from building up along the carryway and tightening in the lower return.

7 Claims, 6 Drawing Sheets

(51) Int. Cl.
   *A21B 1/08* (2006.01)
   *A21B 1/48* (2006.01)
   *B65G 23/10* (2006.01)
   *B65G 15/60* (2006.01)
   *B65G 23/44* (2006.01)

(52) U.S. Cl.
   CPC ............. *B65G 23/10* (2013.01); *B65G 23/44* (2013.01); *B65G 45/14* (2013.01)

(58) Field of Classification Search
   CPC .... B65G 47/248; B65G 47/252; B65G 15/60; B65G 15/62; A21B 1/08; A21B 1/48; A47J 37/044; A47J 37/045
   USPC ......................................................... 198/834
   See application file for complete search history.

(56) References Cited

U.S. PATENT DOCUMENTS

| | | | |
|---|---|---|---|
| 3,860,105 A | 1/1975 | Johnson | |
| 4,492,304 A * | 1/1985 | Geis ...................... | B65G 21/20 198/837 |
| 4,706,336 A | 11/1987 | Hartmann et al. | |
| 4,735,817 A | 4/1988 | Smith | |
| 4,942,810 A | 7/1990 | Zittel et al. | |
| 4,966,072 A | 10/1990 | Ellis-Brown | |
| 5,040,670 A * | 8/1991 | Mendoza ............... | B65G 17/08 198/834 |
| 5,077,072 A | 12/1991 | Sieradzki | |
| 5,161,666 A | 11/1992 | Pope | |
| 5,410,951 A | 5/1995 | Ledet et al. | |
| 5,497,872 A | 3/1996 | Pennino | |
| 5,570,626 A | 11/1996 | Vos | |
| 5,615,606 A | 4/1997 | Vos | |
| 5,632,915 A * | 5/1997 | Schnetzer .......... | B23K 26/0838 198/689.1 |
| 5,657,853 A | 8/1997 | Pennino | |
| 5,666,876 A | 9/1997 | Vos | |
| 5,931,084 A | 8/1999 | Blanga | |
| 7,069,841 B2 | 7/2006 | Ledet et al. | |
| 7,131,531 B1 * | 11/2006 | Ryan ...................... | B65G 15/60 198/842 |
| 7,179,160 B2 | 2/2007 | Hulin | |
| 7,850,562 B2 | 12/2010 | DeGroot | |
| 8,028,618 B2 * | 10/2011 | Lapeyre ................. | B65G 45/14 198/493 |
| 9,296,565 B2 * | 3/2016 | Batchelder ............. | B65G 15/62 |
| 9,457,959 B2 * | 10/2016 | Menke ................... | B65G 17/08 |

OTHER PUBLICATIONS

International Search Report and Written Opinion of the International Searching Authority, PCT/US2018/059132, dated Feb. 20, 2019, Korean Intellectual Property Office, Republic of Korea.

* cited by examiner

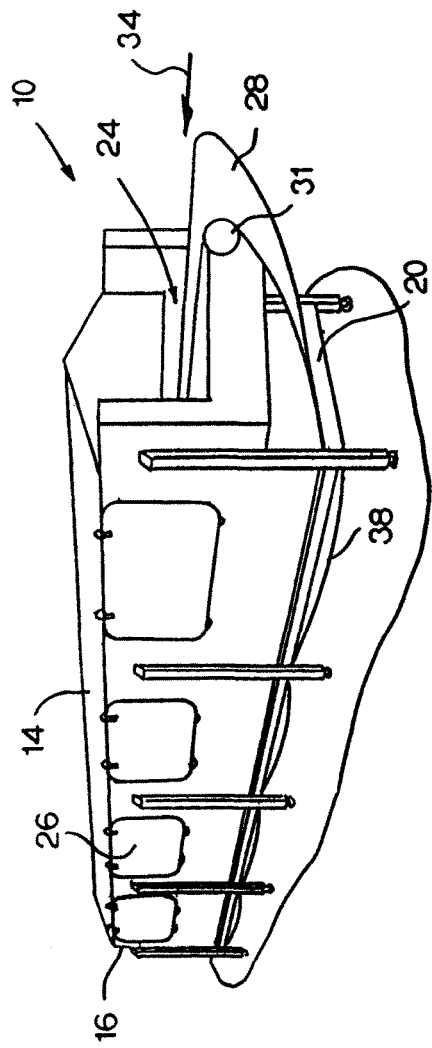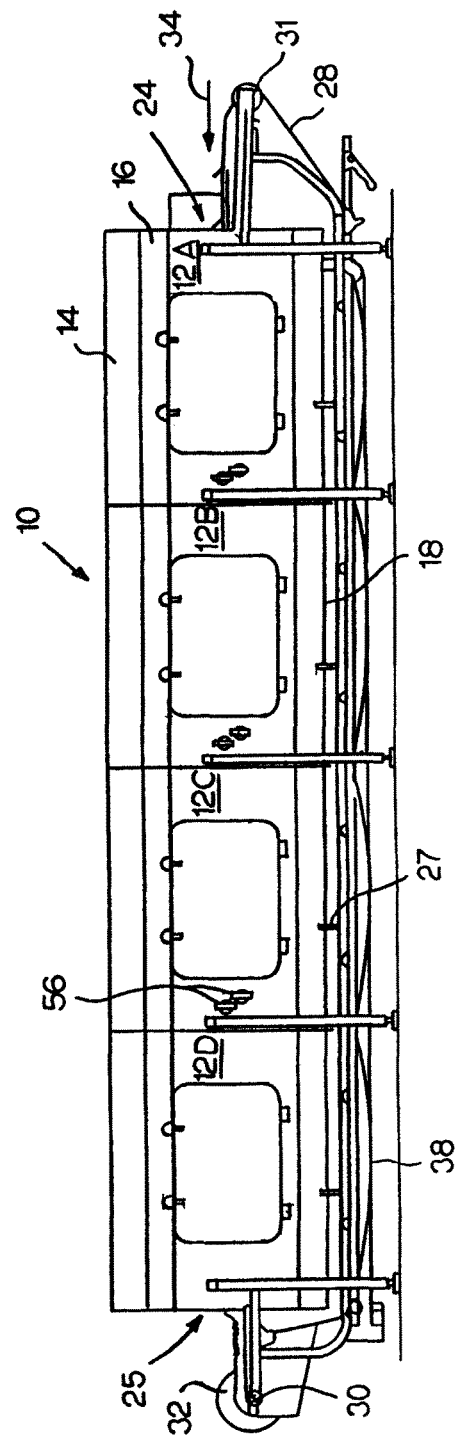

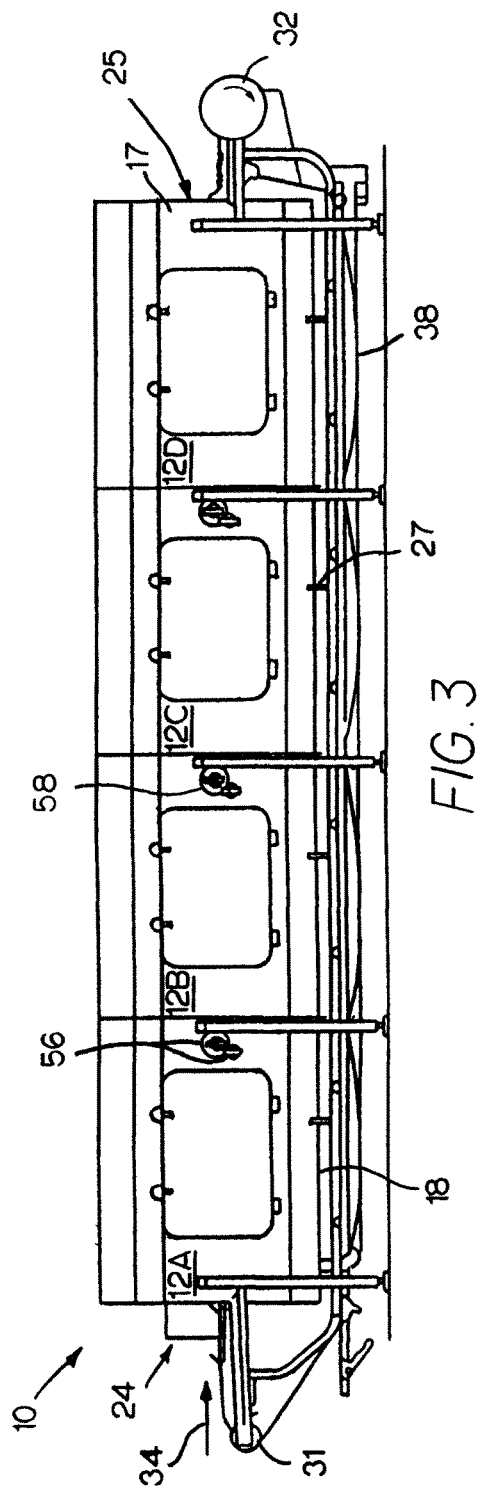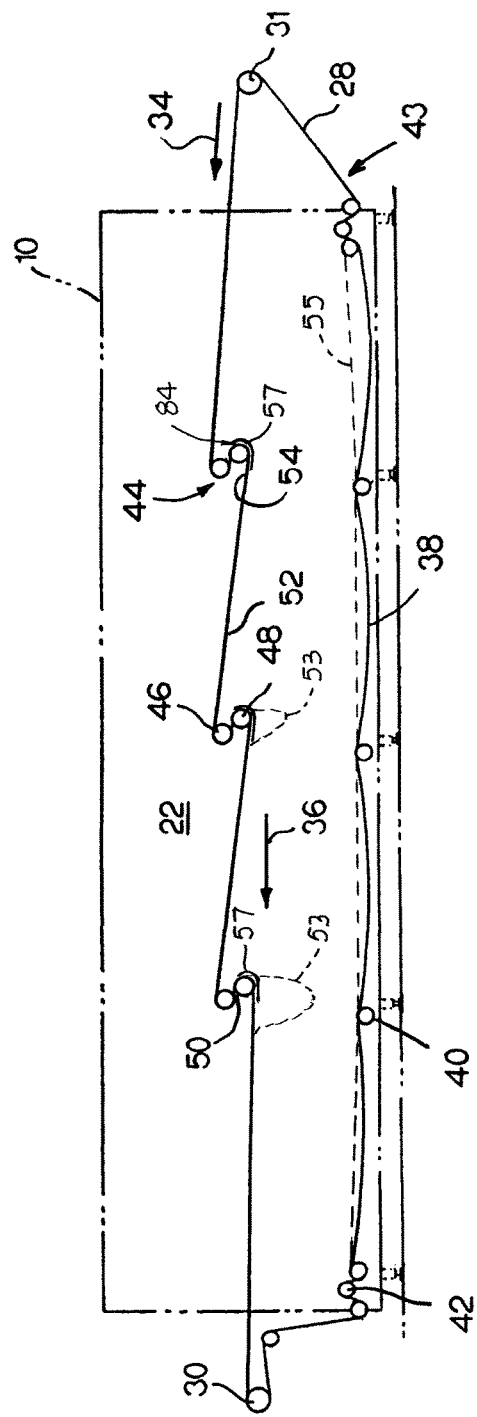

CONTINUOUS PRODUCT-PROCESSING APPARATUS AND METHOD FOR CLEANING WITH PRODUCT REPOSITIONING

BACKGROUND

The invention relates generally to product-processing apparatus and method for its cleaning, especially apparatus processing products conveyed on conveyor belts with product repositioners.

Product-processing apparatus, such as chillers, steam cookers, and blanchers, are often used to cook or cool food products, such as vegetables, nuts, and shrimp. In continuous shrimp cookers, for example, shrimp are conveyed through a steam-filled chamber on a conveyor belt by a main drive motor. To uniformly cook the shrimp, which may sit on the conveyor belt in a thick layer, it is often necessary to reposition the shrimp one or more times along the belt's carryway path through the cooking chamber. The conveyor belt is guided around an upper, forward roller and a lower, rearward roller in an S-shaped back flip along the conveying path. Shrimp drop off the upper portion of the belt winding around the upper roller and land on the lower portion of the conveyor belt exiting the lower roller. In this way, the shrimp are repositioned on the belt with previously unexposed portions exposed to the cooking steam. Such a repositioning S-flip for a flighted belt is described in U.S. Pat. No. 8,028,618, "Cooler Apparatus and Method," Oct. 4, 2011, to Robert S. Lapeyre. In the Lapeyre cooker, the upper roller and the lower roller rotate at a greater speed than the belt is driven by the main drive motor. The belt slips on the rollers, and the relative sliding scrapes debris and slime off both the belt and the rollers. But when the belt is lightly loaded, the slip decreases and the belt tends to build up upon exiting the S-flip ahead of the slower moving drive sprockets. The slack in the belt on the carryway necessarily means that the belt is taut and highly tensioned in the return. As the slack continues to build in the carryway, the belt can break in the return.

SUMMARY

One version of a product-processing apparatus embodying features of the invention comprises a processing chamber having an entrance at one end and an exit at an opposite end through which a conveyor conveys products. The conveyor includes a conveyor belt having an outward-facing conveying side and an opposite non-conveying side and a main drive rotating at a first rate and driving the conveyor belt through the entrance and out the exit along a carryway path through the processing chamber and back from the exit to the entrance along a lower belt-return path. An upper diverting roller disposed in the processing chamber has a periphery engaging the non-conveying side of the conveyor belt. A lower diverting roller disposed in the processing chamber below the upper diverting roller has a periphery engaging the conveying side of the conveyor belt. The carryway path is diverted around the upper and lower diverting rollers along an S-shaped path segment. A roller drive rotates the upper and lower diverting rollers at a second rate greater than the first rate. Means for lowering belt-return tension engages the conveyor belt and prevents it from building up along the carryway path.

One means for lowering belt-return tension is a belt restricter extending around a portion of the periphery of the lower diverting roller close enough to prevent the conveying belt from sagging after exiting the lower diverting roller. Another exemplary means for lowering belt-return tension is a one-way ratchet sprocket in the main drive that engages the conveyor belt.

In another aspect, a method embodying features of the invention for scraping debris from a conveyor belt conveying product through and repositioning the conveyed product in a cooker comprises: (a) advancing a conveyor belt around upper and lower diverting rollers defining an S-shaped path segment for the conveyor belt, wherein the upper diverting roller engages a non-conveying side of the conveyor belt and the lower diverting roller engages an opposite conveying side; (b) overdriving the lower diverting roller to rotate at a speed greater than the belt speed of the conveyor belt to scrape debris from the conveying side of the conveyor belt; and (c) preventing the conveyor belt from building up below the lower diverting roller.

BRIEF DESCRIPTION OF THE DRAWINGS

FIG. 1 is a perspective view of one version of a product-processing apparatus embodying features of the invention;

FIG. 2 is a side elevation view of one side of the apparatus of FIG. 1;

FIG. 3 is a side elevation view of the other side of the apparatus of FIG. 1;

FIG. 4 is a side elevation schematic viewed from the same side as FIG. 2 illustrating the conveying path of the conveyor belt in the apparatus of FIG. 1;

DETAILED DESCRIPTION

Figure 5:
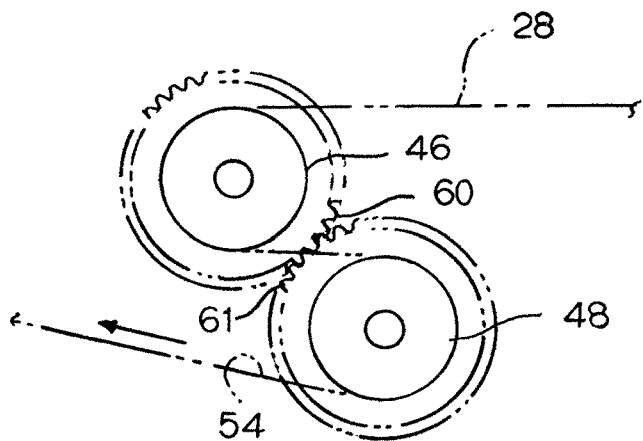
FIG. 5 is a side view of upper and lower diverting rollers in the apparatus of FIG. 1.

A continuous product-processing apparatus embodying features of the invention is shown in FIGS. 1-4. A cooker 10 is used as an exemplary product-processing apparatus for the purpose of describing the inventive features, which can also be implemented in blanchers or chillers, for example. The cooker 10 is constructed of modular sections 12A-12D, each having a roof 14, side walls 16, 17, and a bottom floor 18, supported in a frame 20. The modular sections are connected end to end to enclose an elongated processing chamber—a cooking chamber 22 in this example—that is generally closed, except for entrance and exit ports 24, 25 at each end. Doors 26 on the side walls of each modular section permit access to the cooking chamber for maintenance, cleaning, and inspection. Steam or other cooking gases are released into the chamber via steam pipes 27 through the floors of the modular sections.

Shrimp, foodstuffs, or other products are transported into the cooking chamber atop a conveyor belt 28. The conveyor belt, which is preferably a foraminous modular plastic conveyor belt, is trained around main drive and idle sprockets 30, 31 just aft and fore of the chamber's exit and entrance. A main drive motor 32 coupled to a drive shaft (not shown) on which the drive sprockets 30 are mounted drives the conveyor belt into the cooking chamber through the entrance 24 and out the exit 25 in a conveying direction 34. The drive motor 32, shaft, and sprockets 30 constitute a main drive that rotates at a first rate. Products on the conveyor are transported through the chamber 22 along a carryway path indicated generally by arrow 36 in FIG. 4. The belt returns from the drive sprockets to the idle sprockets 31 along a returnway path preferably located 38 outside the cooking chamber for easy access. Return rollers 40, or shoes, take up belt sag in the returnway. Tensioning rollers 42 are used to adjust the tension of the belt. The belt, sprockets, rollers, shafts, and motor constitute a cooker conveyor 43.

In the example cooker shown, the conveyor belt 28 undergoes three back flips 44 along the carryway path 36. Each back flip is enabled by a forward, upper diverting roller 46 and a lower, rearward diverting roller 48 positioned below and closer than the upper roller to the entrance 24 into the chamber. The upper and lower diverting rollers guide the conveyor belt along an S-shaped path segment 50 in the carryway path.

The periphery of the upper diverting roller 46 engages an inward-facing non-conveying side 52 of the conveyor belt. The periphery of the lower diverting roller engages an outward-facing conveying side 54 of the belt opposite the non-conveying side. Product riding atop the belt drops off the conveying side as the belt is diverted around each upper diverting roller and lands on the conveying side of the belt just after the belt's exit from the lower diverting roller at the end of the S-shaped path segment. The drop repositions product for more uniform exposure to the cooking medium.

Each of the diverting rollers 46, 48 is supported in bearing blocks 56 mounted to the side walls 16, 17 of the modular sections. In this example, three of the modular sections (12A, 12B, and 12C) are virtually identical repositioning sections that include a back flip. The final section 12D is a standard section without a flip. As best shown in FIG. 4, the carryway path through each of the repositioning modular sections is slightly inclined leading into the back flip to compensate for the belt's drop in elevation at each back flip.

Figure 9:
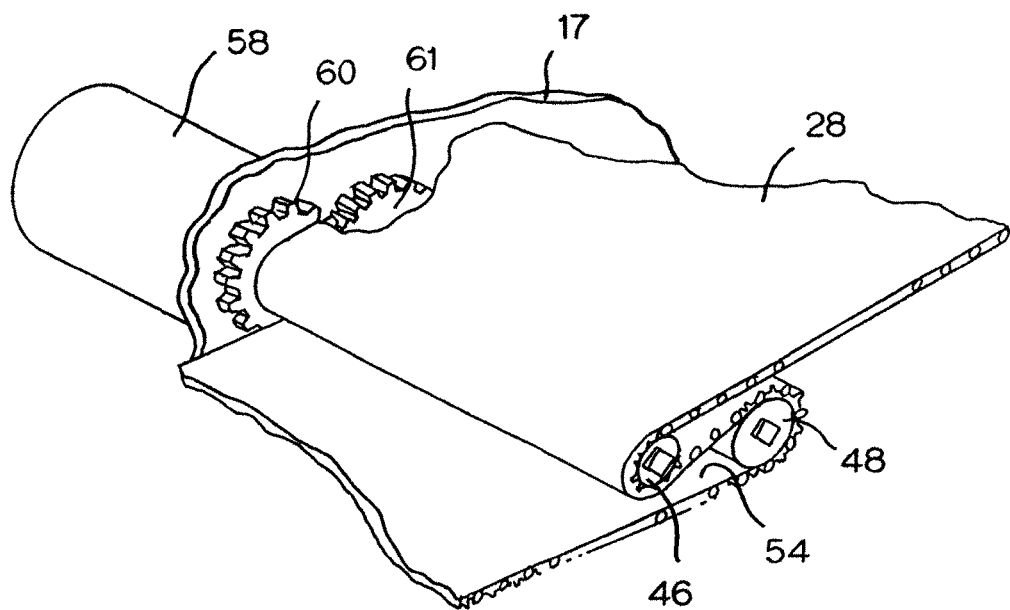
FIG. 9 is a fragmentary isometric view of a product-repositioning portion of the conveyor in the apparatus of FIG. 1.

As shown in FIGS. 3 and 9, a roller drive including a motor 58 is coupled to the upper and lower diverting rollers. The roller drive rotates at a second rate greater than the rate of the main drive. As also shown in FIG. 5, the upper and lower diverting rollers 46, 48 have gears 60, 61 that mesh to rotate the linked rollers together. A rotor (not shown) between the motor 58 and the gear 60 allows the belt 28, when moving faster than the gear, to ratchet forward over the gear. Driving the diverting rollers helps reduce the load of the belt wound around the drive sprockets 30 driven by the main drive motor 32, which rotates the sprockets at a rate lower than that of the diverting rollers 46, 48. If the diverting rollers are overdriven, i.e., rotated at a speed greater than the belt speed, the conveyor belt slips relative to the peripheries of the diverting rollers 46, 48. The difference in speed between the diverting rollers 46, 48 and the belt effects a sliding motion between the peripheries of the rollers and the non-conveying and conveying sides 52, 54 of the belt that scrapes debris off the belt and the diverting rollers.

Figure 6:
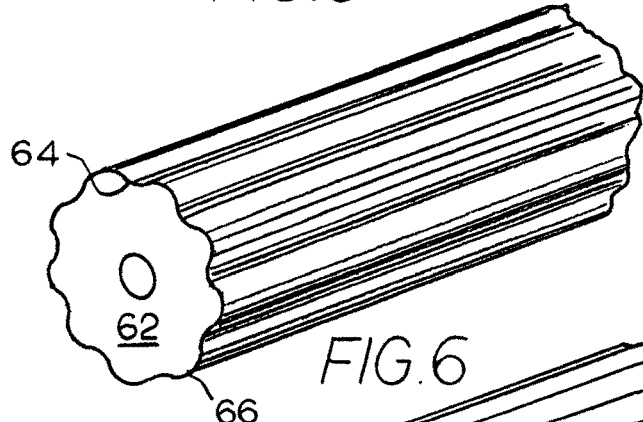
FIG. 6 is a fragmentary isometric view of one version of a diverting roller usable in an apparatus as in FIG. 1.
Figure 7:
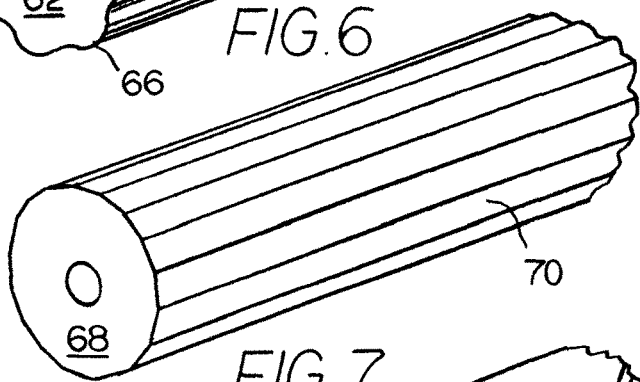
FIG. 7 is a fragmentary isometric view of another version of a diverting roller usable in an apparatus as in FIG. 1.
Figure 8:
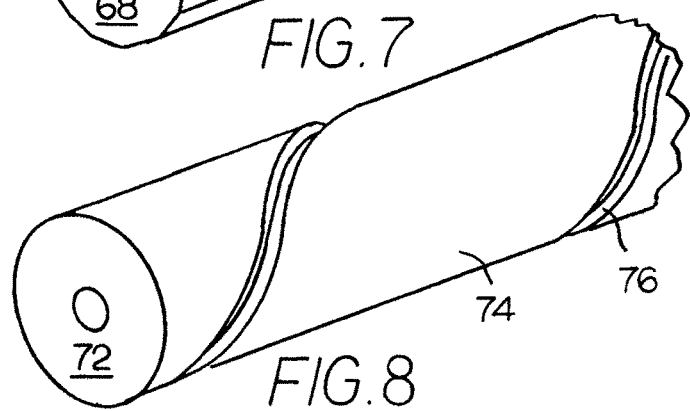
FIG. 8 is a fragmentary isometric view of yet another version of a diverting roller usable in an apparatus as in FIG. 1.

The diverting rollers 46, 48 shown in FIGS. 5 and 9 both have circular cylindrical peripheries. But the periphery of the lower diverting roller is more effective at scraping off debris and helping drive the belt with a variegated surface, such as one of those example surfaces shown in FIGS. 6-8. The diverting roller 62 in FIG. 6 has a series of alternating axial grooves 64 and ridges 66 circumferentially spaced around its periphery. The diverting roller 68 in FIG. 7 has a polygonal periphery 70. And the diverting roller 72 in FIG. 8 has a circular cylindrical periphery 74 with a helical groove 76 cut into it. These are just three examples of variegated peripheral surfaces that may be used on the peripheries of the lower diverting roller to enhance cleaning and overdriving of the belt.

Figure 10:
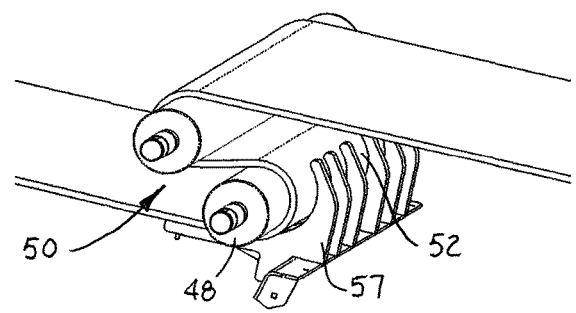
FIG. 10 is an isometric view of an S-flip as in the apparatus of FIG. 4.
Figure 11:
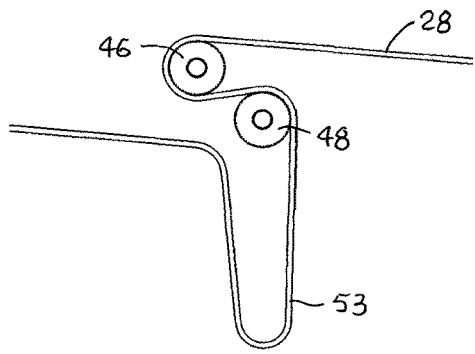
FIG. 11 is a side elevation view of an S-flip as in the apparatus of FIG. 4 without a belt restricter.
Figure 12:
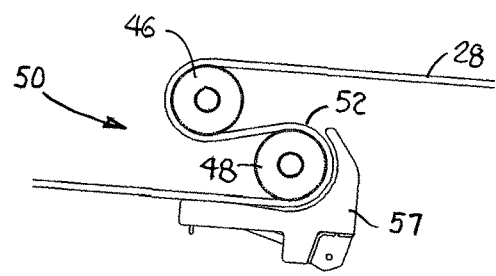
FIG. 12 is a side elevation view of the S-flip of FIG. 10.
Figure 13:
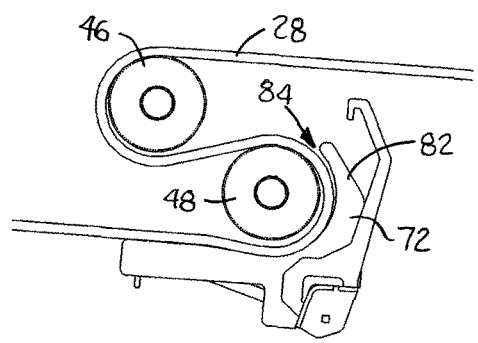
FIG. 13 is a side elevation view of the S-flip of FIG. 12 showing a belt restricter causing a conveyor belt to loosen around the diverting rollers.

The conveyor belt 28, especially when lightly loaded, can be driven by the diverting rollers 46, 48 at a speed greater than the speed of the drive sprockets 30. When that happens, the conveyor belt 28 slackens coming out of the product-repositioning, S-shaped path segments, or S-flips, 50, as indicated by the sagging belt portions shown as dashed lines 53 in FIG. 4 and enlarged in FIG. 11. As the length of belt increases along the carryway 36, the length of belt 55 in the return decreases, which tightens the belt and increases tension in the return. To prevent the tension from increasing to the belt's breaking point, belt restricters 57 extending around a portion of the peripheries of the lower rollers 48 engage the belt's non-conveying side 52 to block the formation of belt slack 53 at the exit of the S-flips 50 as also shown in FIGS. 10 and 12. Instead, as shown in FIG. 13, the belt 28 loosens around the upper and lower diverting rollers 46, 48, which decouple from the belt, thereby slowing the belt speed at the S-flips 50 and lessening the buildup, or accumulation, of belt on the carryway 36. Fewer sags in the belt 28 on the carryway 36 allow for more belt and less tension in the return. Thus, the belt restricters 57 act as means for lowering belt-return tension.

Figure 14:
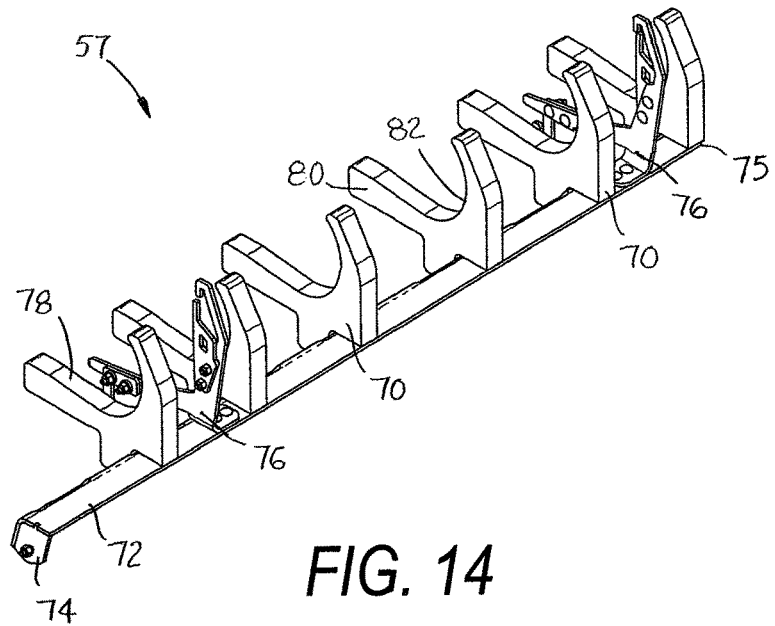
FIG. 14 is an isometric view of a belt restricter usable in the apparatus of FIG. 4.

More details of the belt restricters are shown in FIG. 14. Each belt restricter 57 comprises a series of restricter segments 70 fastened to a horizontal support bar 72 that extends across the width of the cooker and attaches to cooker framework at its ends 74, 75. Hangers 76 attached to the support bar 72 hook into cooker structure above and below the support bar to further hold the restricter 57 in place. The restricter segments 70 have a hook- or J-shaped bearing surface 78 that fits close to the lower diverting rollers. The shank portion 80 of the J-shaped restricter segment 70 extends downstream generally tangentially past the bottom-most exit point of the lower roller to prevent the conveyor belt from building up after separating from the lower roller as it could in the absence of a restricter. The hooked or curved portion 82 of the restricter segments 70 extends close to 180° around the periphery of the lower roller and restricts the excursion of the conveyor belt by confining it to a narrow curved gap 84 (FIG. 13) around a portion of the roller. The shank portion could be curved to give the restricter segments a C shape. Although the restricter 57 shown in FIG. 14 is segmented into spaced apart segments 70, it could be a single continuous piece extending across all or part of the width of the lower diverting roller. Instead of having a stiff construction, the restricter could be made of canvas or another fabric, for example, for the flexibility to change shape as it engages the belt.

Figure 15:
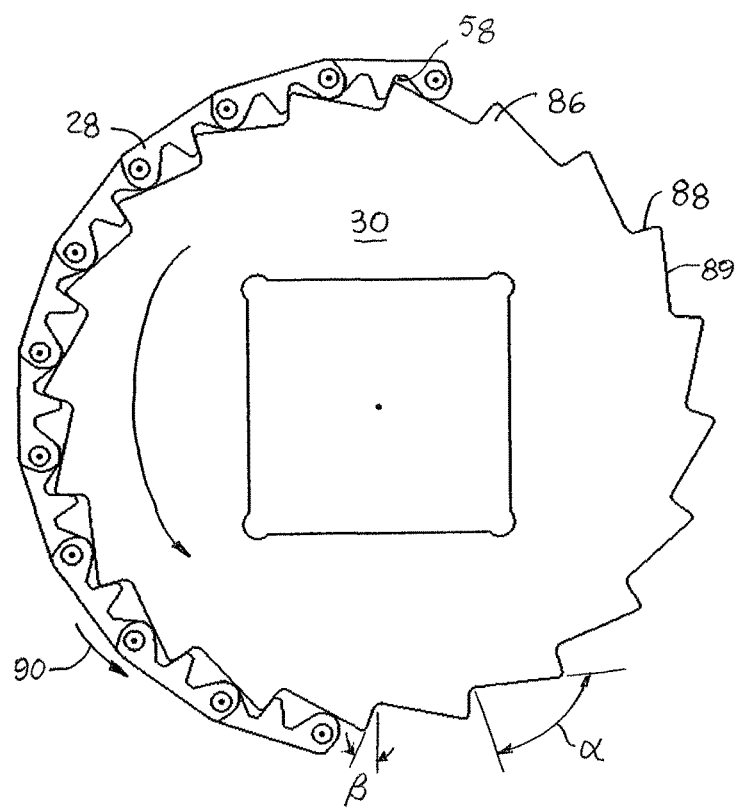
FIG. 15 is a side elevation view of a one-way drive sprocket usable in an apparatus as in FIG. 1.

Another means for lowering return tension in a conveyor belt is shown in FIG. 15. In this version, the main drive sprockets 30 are one-way sprockets having asymmetrical teeth 86 with steep drive faces 88 and gradual trailing faces 89. The profile angle α of the trailing faces 89 is much greater than the profile angle β of the drive faces 88. The teeth 86 engage the non-conveying side 58 of the belt 28. Because the slope of the trailing faces 89 is low, the belt 28, when being pulled by a taut stretch of belt in the return faster than the sprockets 30 are rotating, ratchets forward 90 around the slower sprockets. In that way the ratcheting one-way drive sprockets 30 allow the faster-moving S-flip rollers to feed more belt around the drive sprockets to relieve belt tension in the return. One-way ratchet sprockets with a conventional ratchet clutch mechanism and pawl can alternatively be used as the main drive sprockets. When either kind of ratchet sprocket is used, the belt restricters of FIG. 14 are not necessary.

What is claimed is:

1. A product-processing apparatus comprising:
a processing chamber having an entrance at one end and an exit at an opposite end;
a conveyor conveying products through the processing chamber, the conveyor including:
a conveyor belt having an outward-facing conveying side and an opposite non-conveying side;
a main drive rotating at a first rate and driving the conveyor belt through the entrance and out the exit along a carryway path through the processing chamber and back from the exit to the entrance along a lower belt-return path;
an upper diverting roller disposed in the processing chamber and having a periphery engaging the non-conveying side of the conveyor belt;
a lower diverting roller disposed in the processing chamber below the upper diverting roller and having a periphery engaging the conveying side of the conveyor belt;
wherein the carryway path is diverted around the upper and lower diverting rollers along an S-shaped path segment;
a roller drive rotating the upper and lower diverting rollers at a second rate greater than the first rate;
a one-way ratchet sprocket in the main drive having teeth with steep drive faces that engage and drive the non-conveying side of the conveyor belt and gradual trailing faces over which the conveyor belt can ride into engagement with leading teeth when advancing faster than the sprocket is rotated at the first rate by the main drive;
wherein the one-way ratchet sprocket lowers belt-return tension by engaging the non-conveying side of the conveyor belt and prevents the conveyor belt from building up along the carryway path.

2. A product-processing apparatus comprising:
a processing chamber having an entrance at one end and an exit at an opposite end;
a conveyor conveying products through the processing chamber, the conveyor including:
a conveyor belt having an outward-facing conveying side and an opposite non-conveying side;
a main drive rotating at a first rate and driving the conveyor belt through the entrance and out the exit along a carryway path through the processing chamber and back from the exit to the entrance along a lower belt-return path;
an upper diverting roller disposed in the processing chamber and having a periphery engaging the non-conveying side of the conveyor belt;
a lower diverting roller disposed in the processing chamber below the upper diverting roller and having a periphery engaging the conveying side of the conveyor belt;
wherein the carryway path is diverted around the upper and lower diverting rollers along an S-shaped path segment;
a roller drive rotating the upper and lower diverting rollers at a second rate greater than the first rate;
a belt restricter extending far enough around the periphery of the lower diverting roller to prevent the conveyor belt from building up below the lower diverting roller, wherein the belt restricter is spaced from the lower diverting roller across a gap having a width narrow enough for the belt restricter to contact the non-conveying side of the conveyor belt and confine it to the gap and wide enough for the conveyor belt to loosen around the lower diverting roller to enable the conveyor belt to slip on the lower diverting roller.

3. Apparatus as in claim 2 wherein the belt restricter is spaced close to and extends around enough of the periphery of the lower diverting roller to block the conveyor belt from sagging after disengaging from the lower diverting roller and loosen the conveyor belt around the upper diverting roller to reduce the belt speed and lessen the buildup of conveyor belt in the carryway path.

4. Apparatus as in claim 2 wherein the belt restricter is J-shaped.

5. Apparatus as in claim 2 wherein the belt restricter has a shank portion extending downstream from the conveyor belt's exit point of the lower diverting roller and a hook portion that curves around a portion of the periphery of the lower diverting roller.

6. Apparatus as in claim 2 wherein the belt restricter comprises restricter segments spaced apart across the width of the lower diverting roller.

7. A method for scraping debris from a conveyor belt conveying product through and repositioning the conveyed product in a cooker, the method comprising:
advancing a conveyor belt around upper and lower diverting rollers defining an S-shaped path segment for the conveyor belt, wherein the upper diverting roller engages a non-conveying side of the conveyor belt and the lower diverting roller engages an opposite conveying side;
overdriving the lower diverting roller to rotate at a speed greater than the belt speed of the conveyor belt to scrape debris from the conveying side of the conveyor belt;
preventing the conveyor belt from building up below the lower diverting roller by contacting and driving the non-conveying side of the conveyor belt at the belt speed with a one-way ratchet sprocket.

* * * * *